United States Patent
Haulin

(10) Patent No.: US 6,236,693 B1
(45) Date of Patent: May 22, 2001

(54) GENERATOR FOR DELAY-MATCHED CLOCK AND DATA SIGNALS

(75) Inventor: Tord Haulin, Uppsala (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 08/961,411

(22) Filed: Oct. 30, 1997

Related U.S. Application Data

(63) Continuation of application No. PCT/SE96/00486, filed on Apr. 15, 1996.

(30) Foreign Application Priority Data

May 2, 1995 (SE) ..................................... 9501608

(51) Int. Cl.[7] .............................. H04L 7/00; H03K 19/00; H03K 17/00
(52) U.S. Cl. ........................... 375/354; 326/93; 327/365; 327/142
(58) Field of Search ..................................... 375/354, 373; 326/93; 370/503; 413/400, 500; 327/141, 142, 144, 263, 265

(56) References Cited

U.S. PATENT DOCUMENTS

| | | | |
|---|---|---|---|
| 5,005,151 | * 4/1991 | Kurkowski | 710/36 |
| 5,022,056 | 6/1991 | Henderson et al. | 375/373 |
| 5,115,455 | 5/1992 | Samaras et al. | 375/354 |
| 5,250,852 | * 10/1993 | Ovens et al. | 327/202 |
| 5,359,630 | 10/1994 | Wade et al. | 375/354 |
| 5,633,601 | * 5/1997 | Nagaraj | 326/38 |
| 5,694,175 | * 12/1997 | Gaigneux et al. | 348/558 |

FOREIGN PATENT DOCUMENTS

| | | |
|---|---|---|
| 41 32 325 | 4/1993 | (DE) . |
| 356 042 | 2/1990 | (EP) . |

* cited by examiner

*Primary Examiner*—Chi Pham
*Assistant Examiner*—Khai Tran
(74) *Attorney, Agent, or Firm*—Burns, Doane, Swecker & Mathis, L.L.P.

(57) ABSTRACT

A delay matched clock and data generator utilizes a re-timing element having the functionality of a two-input multiplexer, connected and operated such that the level on the output(s) is controlled from level control inputs, and the timing of transitions on the output(s) is controlled from timing control inputs. The level control inputs on the re-timing element correspond to the data input(s) on an equivalent multiplexer. The generator further has control inputs for stopping the clock low or stopping the clock high, and the generator may be operated for polarity independent clock gating or clock synthesis.

12 Claims, 8 Drawing Sheets

PRIOR ART

TRANSMIT SIDE  RECEIVE SIDE

PRIOR ART

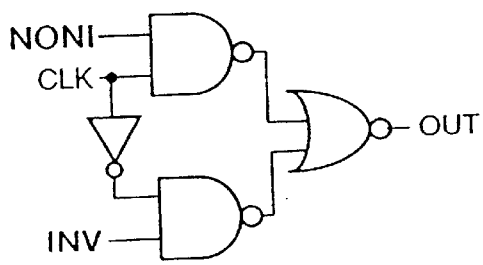 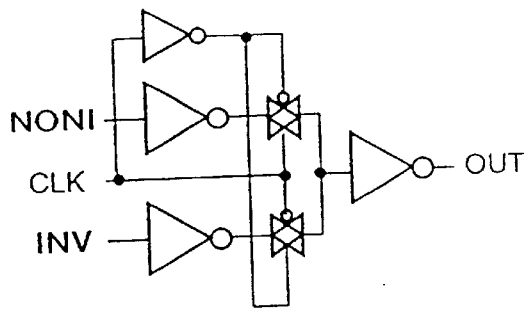
Fig. 7a            Fig. 7b
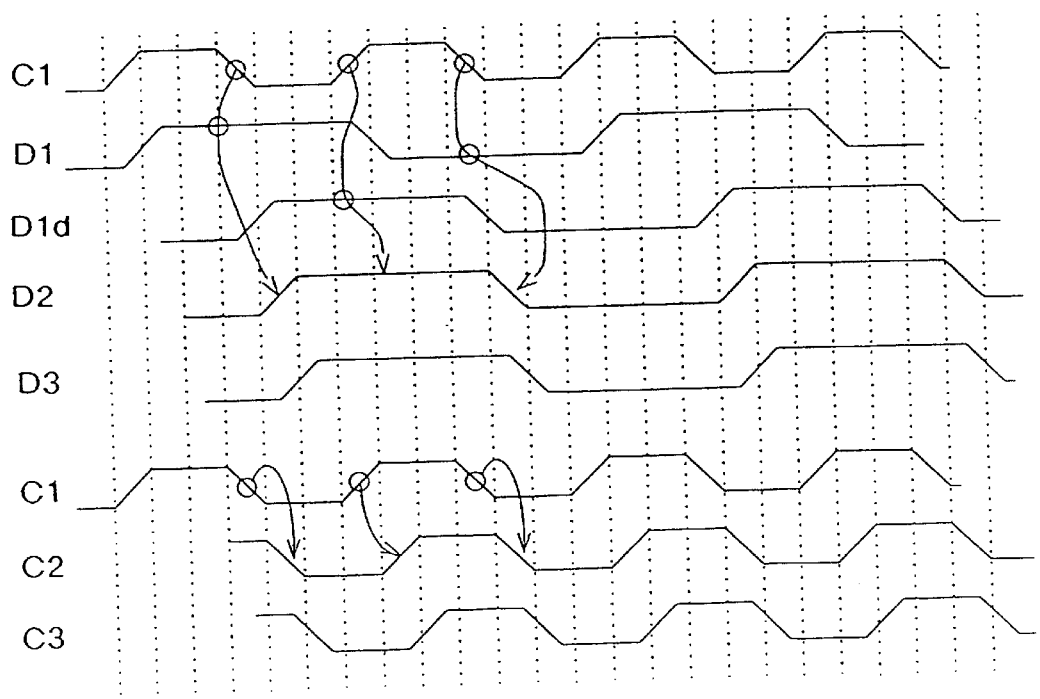
Fig. 8

US 6,236,693 B1

GENERATOR FOR DELAY-MATCHED CLOCK AND DATA SIGNALS

This application is a continuation of International Application No. PCT/SE96/00486, filed Apr. 15, 1996, which designates the United States.

TECHNICAL FIELD

This invention pertains to data transfer from a data source to a destination for the data and more precisely, to data transfer where the data source provides both data signals and a clock signal to the destination, whereby this clock signal is used for clocking data receiving flip-flops at the destination.

BACKGROUND

Synchronous systems provide many advantages in design and use. Pacing the system with a global clock enhances robustness and simplifies the logic design by making timing restrictions single bound. Lower bound delay problems are taken care of by the clock system. As system clock speeds have increased, clock buffer delays have created problems in that clock signals are not switching simultaneously everywhere in the system. This can be overcome to varying degrees by three types of improvements:

1) At moderately high clock frequencies the delays associated with on-chip clock buffering dominates. This means the clock signals actually clocking flip-flops and/or other clocks elements on the circuits lag the global reference clock substantially. By the use of a PLL based on-chip clock buffer system the delays associated with clock buffering and on-chip clock distribution can be canceled.

2) When even higher speed data signals are sent over some distance in general, and from one circuit to another in particular, signal delays can render the use of a global synchronous clock impossible. The finite signal propagation velocity in electrical or optical distribution makes the concept of contemporaneousness or simultaneity meaningless. Often, this limitation is overcome by the use of a synchronization circuitry, adaptively adjusting the phase relation between clock and data signal at the destination, in the receiver's phase domain. Synchronization circuitry, increases system cost and power consumption.

3) For high frequency signals sent over fairly short distances in controlled signalling environments, a more simple solution is possible. The problem of strobing or clocking the data signal at the proper instant can be overcome by sending both a data and a clock signal from the data source to the destination via carefully delay matched wiring. This clock signal is used in the receiver for strobing data at times when the data has valid logic levels only.

A typical application according to prior art using clock and data transfer is demonstrated in FIG. 1, which is an all differential signal implementation.

Modern integrated circuit technology allows higher and higher clock frequencies to be used for the data transfers. This puts higher and higher demands on matching of all delays in the signal paths for clock and data. The different nature of clock and data signals presents a difficulty in generating clock and data signals with perfect matching of pulse edge positions. Data signals have their edge positions controlled from a clock signal via a flip-flop. To generate a clock signal with matched edge positioning is difficult. Wherever possible, identical circuit elements are used for accomplishing matched delays. To generate the clock signal also from the output of a flip-flop, would require a 2× frequency source clock signal, since the output of a flip-flop can only change in response to one of the edges of the signal connected to the flip-flop clock input. In high speed applications, however, clock frequencies have already been pushed to the limits of the process technology. In an implementation according to FIG. 1, that speed could not be reached because the receiving flip-flop FR will not be clocked near the optimum points in the data pattern.

In FIG. 2 the signal timing for a particular set of operating conditions A, is shown. Here, it would seem safe to use the rising edge of clock C5 for clocking the data signal D5 into flip-flop FR, whereas the negative edge of C5 would not yield stable results when taking set up time $t_{su}$ into consideration. However, this statement is based on a single observation only.

In FIG. 3 processing, voltage and/or temperature are assumed to have changed such that the gate delays and thus $t_{su}$ in the circuits are doubled. Now, it is clear that the negative edge of clock C5 would be preferred instead of the positive edge for clocking data D5 at the receiving flip-flop FR, as was the case in FIG. 2. Hence, it is important to consider the variations of gate delays due to varying operational conditions in order to achieve maximum operating frequency.

In order to have reliable operation at high speed signalling under varying operating conditions, the variation in the strobe point relative to the received data signal must be minimized. Since the transmitting and receiving circuits can be operating together under different conditions in terms of processing, voltage and temperature, tracking can only be achieved if transmitter delays are compensated for in the transmitter circuit, and receiver delays are compensated in the receiver circuit. The only delay difference on the transmitter clock and data outputs that does not vary with operating conditions is zero.

The circuit of FIG. 1 has a delay difference on the clock and data outputs equal to the delay of the clock C1 to the Q output of the FT flip-flop. For delay compensation, the clock signal(s) must be delayed by the same amount. A carefully laid out replica of the elements making up the clock to Q delay inside the flip-flop FT, can achieve this if built next to the flip-flop in the same circuit, such that the operating conditions are the same. However, the very nature of a flip-flop makes it difficult to achieve minute matching without also dividing the clock signal frequency by two.

In several prior art documents treating synchronization, a global clock signal frequency has been increased so much that the concept of contemporaneity is no longer meaningful. The clock signals at the different destinations are isochronous (correct frequency, but arbitrary phase), but not synchronous. Several documents, for example EP-B1-0 356 042, DE-A1-4 132 325, U.S. Pat. No. 5 022 056, U.S. Pat. No. 5 115 455 and U.S. Pat. No. 5 359 630, describe different ways of handling this uncertainty in phase. All of these utilize multiplexers, but not for retiming. The select inputs are used to select one of the data inputs to the multiplexer, to have said inputs control timing of transitions on the output.

Particularly the last two references may be considered as closely related to the present invention, but in spite of a clock signal being sent from the same place as the data signal no attempt is made to match the delays. Instead a complicated synchronization function is used at the receiving side.

SUMMARY

According to a first objective of the present invention a delay matched clock and data generator is utilizing a re-timing element, whereby the functionality of a two input multiplexer, connected and operated such that the level on the output(s) is controlled from level control inputs and the timing of transitions on the output(s), is controlled from timing control inputs, the level control inputs on the re-timing element correspond to the data input(s) on the equivalent multiplexer.

Further objectives according to the present invention are set out by the independent claims.

SHORT DESCRIPTION OF THE DRAWINGS

The invention will be described by preferred embodiments to be contemplated with reference to the accompanying drawings wherein like reference designations are used throughout to designate like parts. In the drawings.

Figure 5:
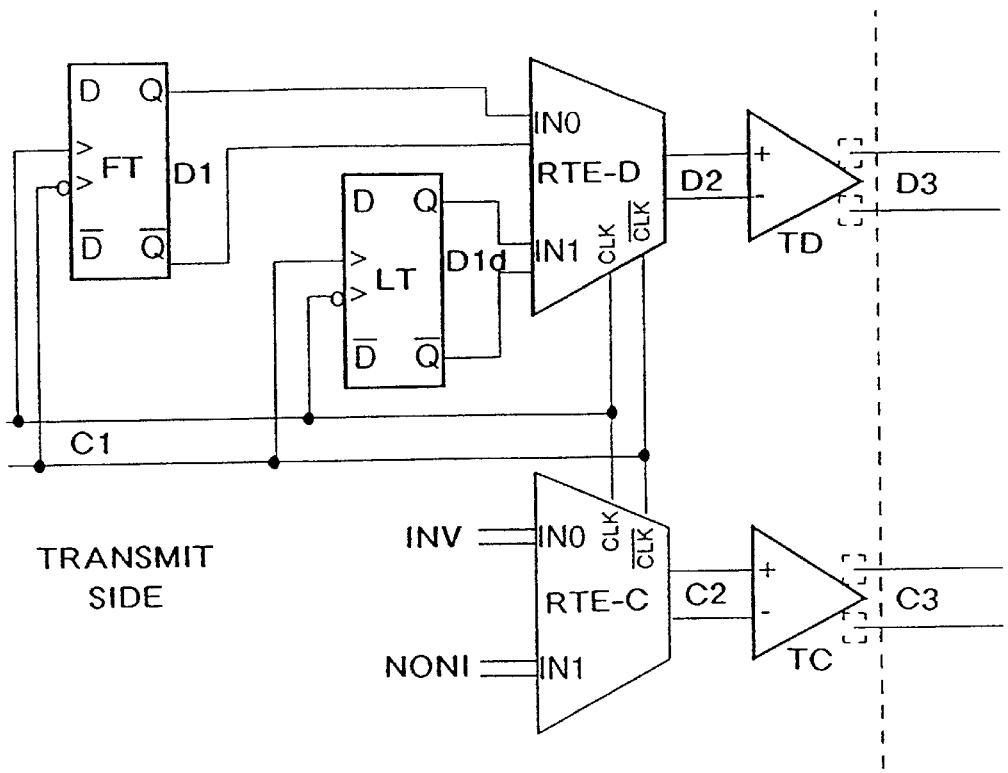
Figure 6:
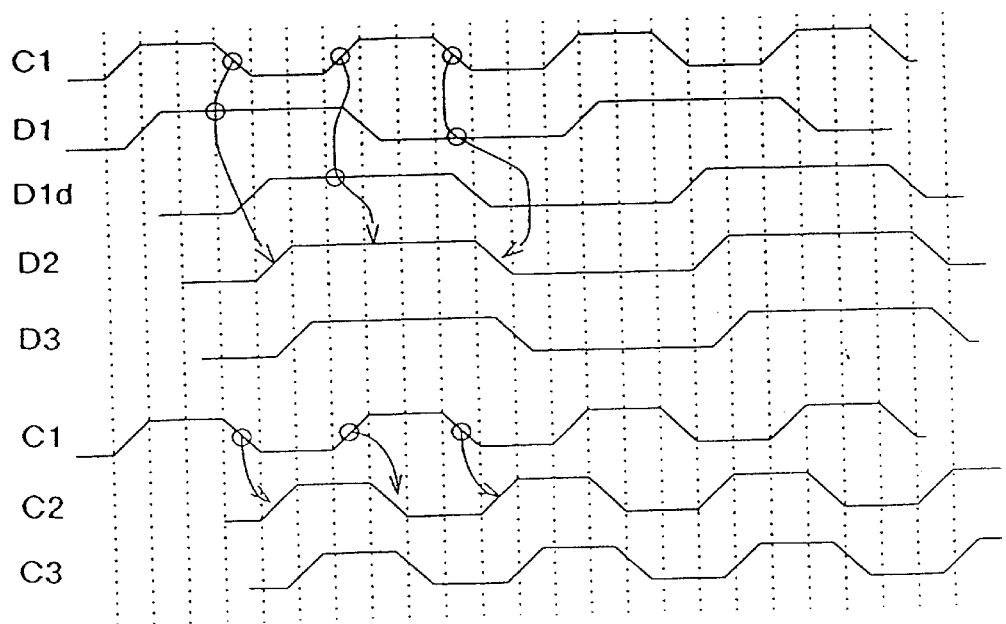
Figure 9:
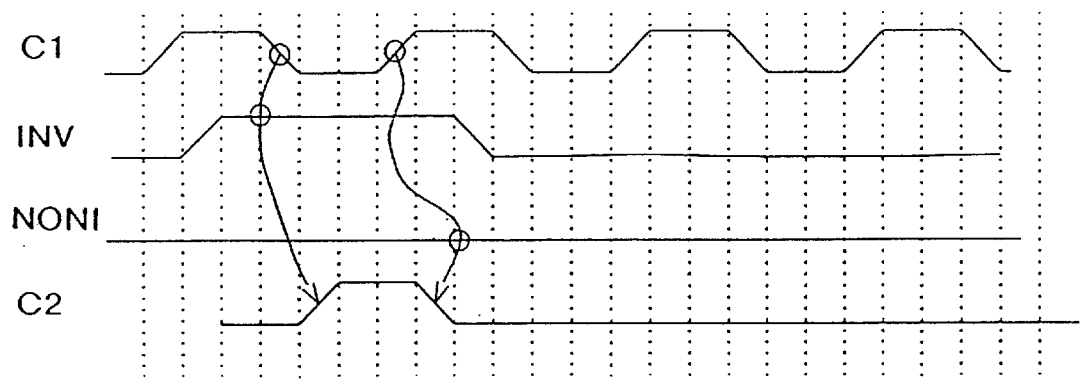
Figure 10:
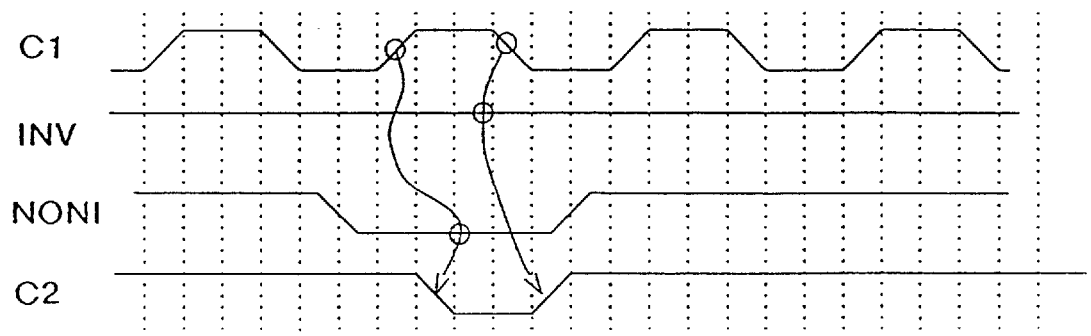
Figure 11:
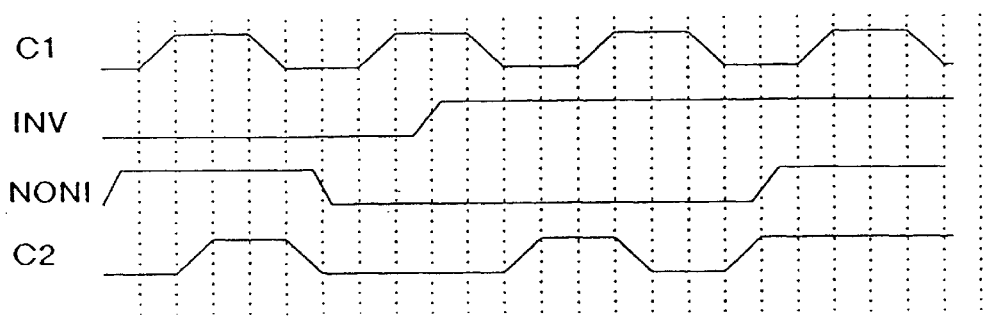
Figure 12:
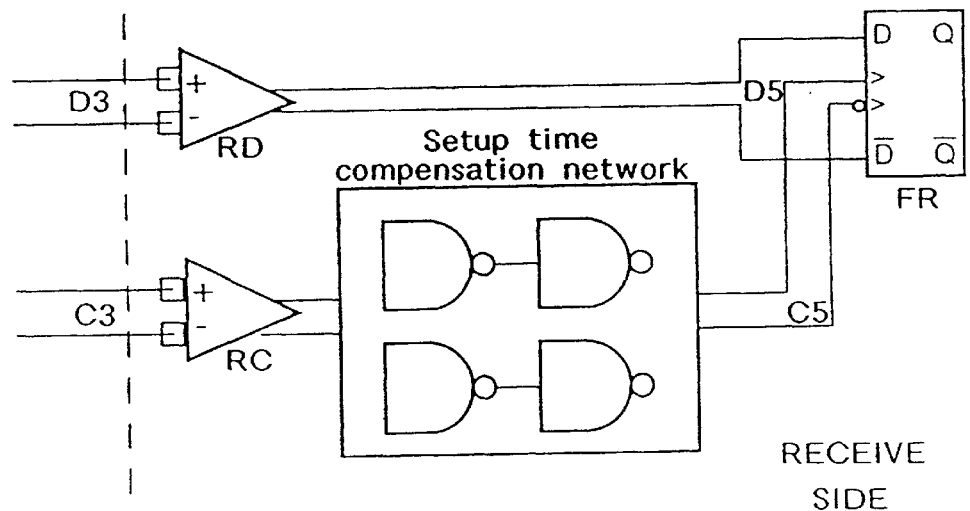
Figure 13A:
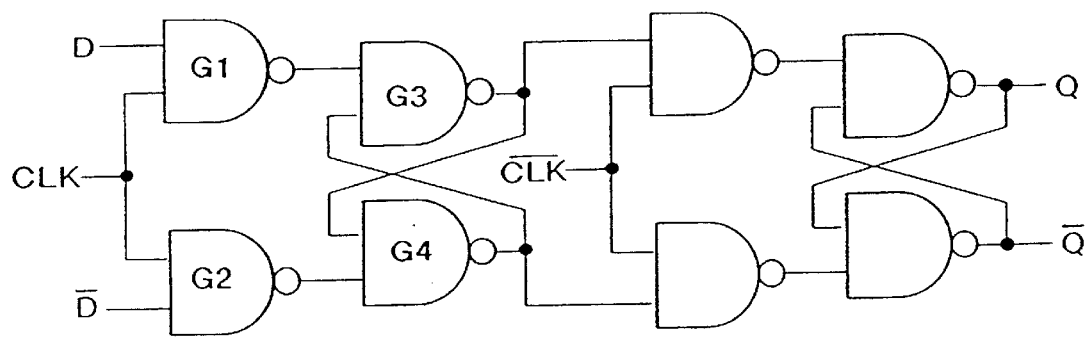
Figure 13B:
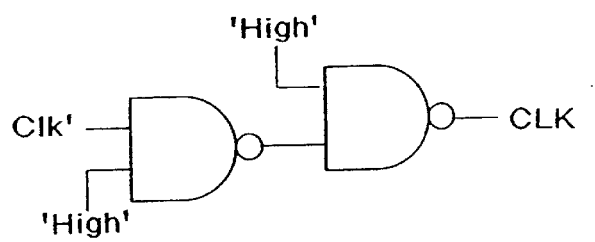
Figure 14A:
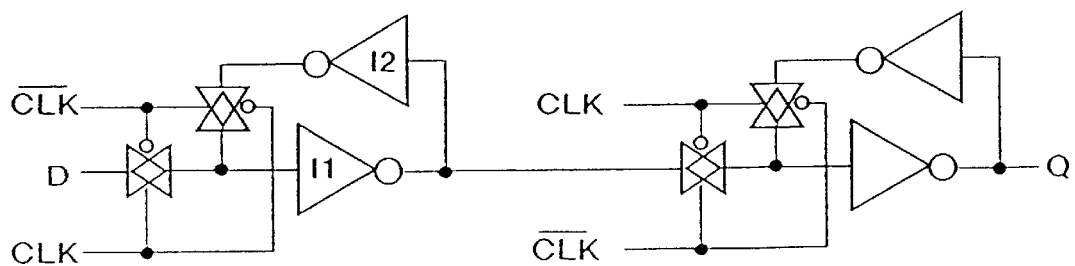
Figure 14B:
Figure 15:
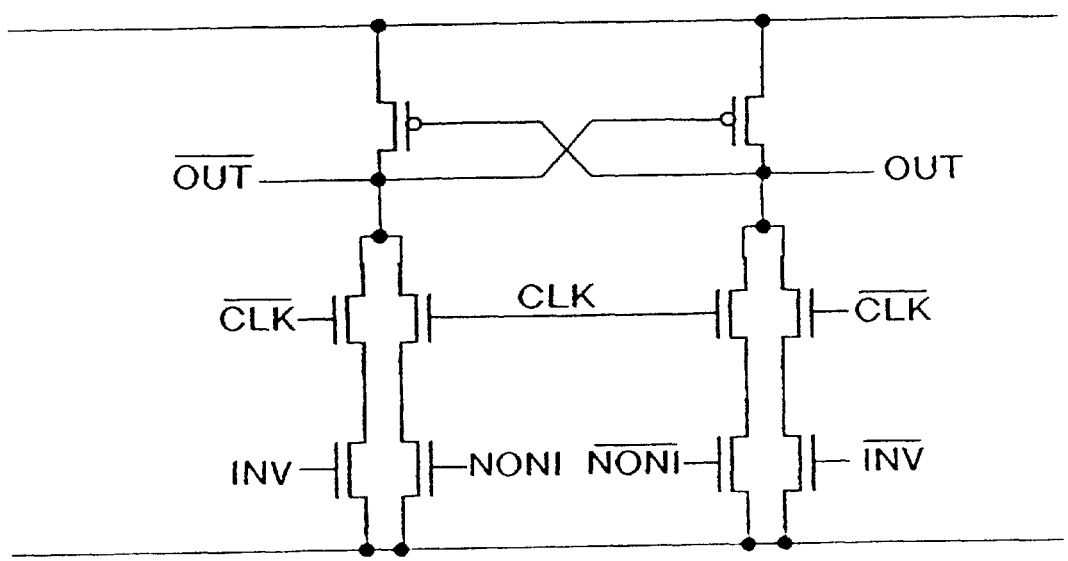

FIG. 5 demonstrates a delay matched clock and data generator;

FIG. 6 shows the delay matched generator timing according to FIG. 5 for INV=1, NONI=0;

FIGS. 7a and 7b demonstrate retiming circuitry with pulse width distortion;

FIG. 8 shows the delay matched generator timing according to FIG. 5 for INV=0, NONI=1;

FIG. 9 shows clock gating INV and NONI for positive clock;

FIG. 10 shows clock gating INV and NONI for negative clock;

FIG. 11 demonstrates a clock synthesis;

FIG. 12 demonstrates one principle for receiver flip-flop setup time compensation according to the present invention;

FIG. 13a is a NAND gate implementation of a master-slave flip-flop;

FIG. 13b is an example of set-up time compensation network for the NAND gate flip-flop of FIG. 13A;

FIG. 14a is a transmission gate implementation of a master-slave flip-flop;

FIG. 14b is an example of set-up time compensation network for the transmission gate flip-flop of FIG. 14A; and FIG. 15 is a detailed example of a differential logic implementation of the retiming element.

DETAILED DESCRIPTION

According to the present invention the desired delay matching is achieved by passing both clock and data through retiming circuitry capable of handling both clock and data signals. This circuitry is operated such that one set of inputs controls the logic level on the output and another set of inputs controls the timing of the transitions of the output signal.

Figure 4A:
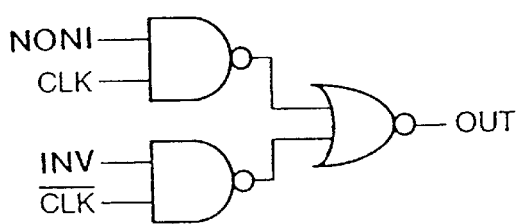
FIGS. 4a and 4b show single ended retiming circuitry implementation examples.
Figure 4B:
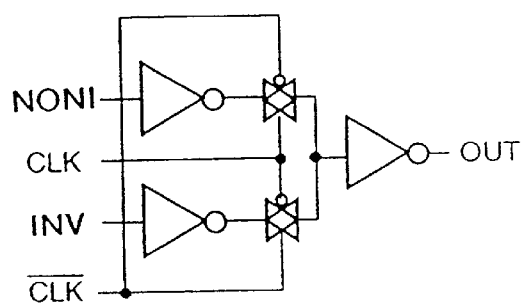

Such circuitry can be implemented in several ways, with logic gates, pass transistor logic etc. The implementations have several things in common. The most important being, that operated in another fashion, they can all serve as multiplexers. Any multiplexer can be used for the delay matched generator. Several types of multiplexers, but not all, can be used for achieving maximum performance in this retiming function which is exemplified in FIGS. 4a, 4b and 15.

In FIG. 5 a delay-matched clock and data signal generator using two retiming elements RTE-D and RTE-C is shown. The data to be transmitted is stored in flip-flop FT. The flip-flop FT need not be part of the generator. It is shown as an example of a means of ensuring proper timing of the signal of input IN0 on retiming element RTE-D. The latch LT is used for delaying data input to IN1 on RTE-D such that a stable level is presented on IN1 of RTE-D for the full duration of time during which the output level D2 is controlled from IN1 of RTE-D. As shown in FIG. 6, this creates a replica of the D1 data on the D2 output of RTE-D. The D2 signal edge placement is controlled from the C1 clock signal. The timing relation is equal to the delay from the CLK inputs to D2 on the retiming element.

The delay-matched clock output is generated from a retiming element RTE-C identical to RTE-D. The control signals INV and NONI have stable levels during the full period of time the output level C2 is controlled from these inputs respectively. In FIG. 6, the C2 behavior is shown for a constant logic one on INV and a constant logic zero on NONI. This creates a rising edge on C2, which is simultaneous with data transitions on D2. Both have the same delay relative to the falling edge C1. In applications where the INV and NONI signals are maneuvered, a similar arrangement to that of the data generation can be used to ensure proper timing of the INV and NONI signals. The INV signal can be generated from a flip-flop clocked by the C1 signal. The NONI signal can be generated from a latch with antiphase clocking. TD and TC represent drivers for off-chip signals.

If a multiplexer used for the retiming has different propagation delays, from the clock/select input to the output for rising and falling edges of the clock/select signal, the two retiming blocks, must be connected to the clock signal(s) in the same fashion, for attaining correct matching. This is demonstrated in FIG. 5 being an all differential equivalent to the principles of FIGS. 4a and 4b. With such a multiplexer, however, there will be a pulse width distortion in the clock signals. This will constitute an unnecessary limitation against achieving maximum operating frequency. Retiming circuitry with pulse width distortion is demonstrated in FIGS. 7a and 7b.

Signals INV and NONI in FIG. 5 can be used to control or gate the clock output while still keeping the matched edge positioning. Taking both INV and NONI low will stop the clock low. Taking them both high will stop the clock high. Setting INV=1 and NONI=0 results in the timing diagram shown in FIG. 6 presenting an inverted clock C3 in relation to C1. As shown in FIG. 8, setting INV=0 and NONI=1 will generate a non-inverted clock C3 relative to the one shown in FIG. 6

To gate the clock signal normally an extra gating stage would be inserted, which should introduce additional delays. An important feature of the delay-matched clock generator according to this invention is that the clock signal can be gated or stopped without compromising the careful delay-matching. This is demonstrated in FIGS. 9 and 10.

Thus setting both signals INV and NONI low results in a low output at output C2 and then setting INV high results in a gated inverted output C2, as is demonstrated in FIG. 9. On the other hand, taking both signals INV and NONI high, will generate a constant high output at S2, while then setting signal NONI low will generate a gated inverted output at C2, as is demonstrated in FIG. 10.

By properly exercising the control signals INV and NONI according to the present invention, a synthesized clock can be created, which is briefly demonstrated in FIG. 11. First one positive pulse of C1 is transferred to C2, then after one full cycle another positive pulse is obtained at C2 by inverting the signal C1 and after another half period the output C2 is set to a constant high level. Thus, the synthesized clock signal can have an arbitrary wave shape with the important restriction that clock output transitions occur only at times controlled from the clock input(s).

Figure 1:
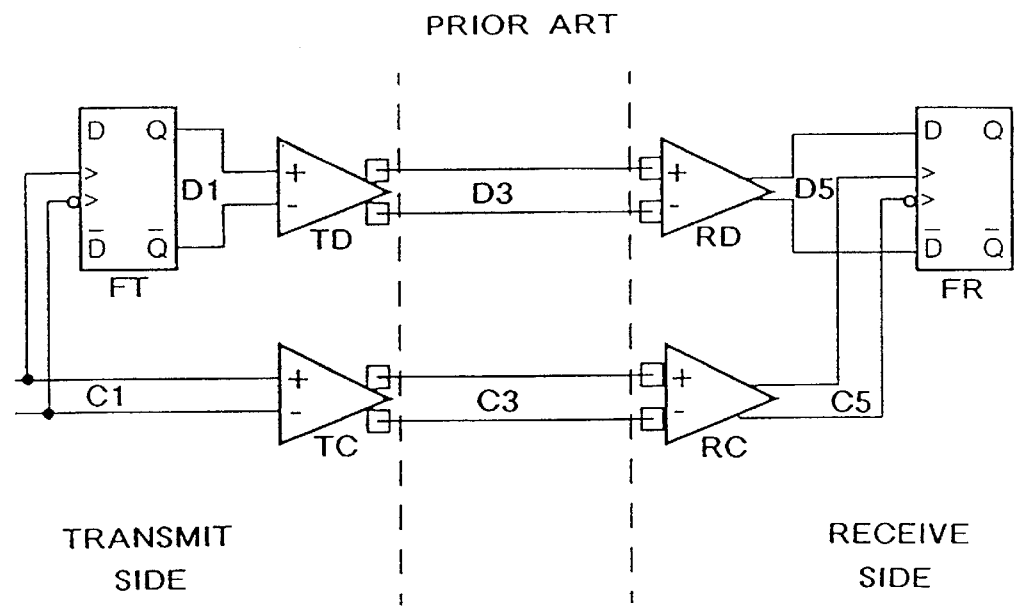
FIG. 1 is as clock and data transmission without delay compensation.
Figure 2:
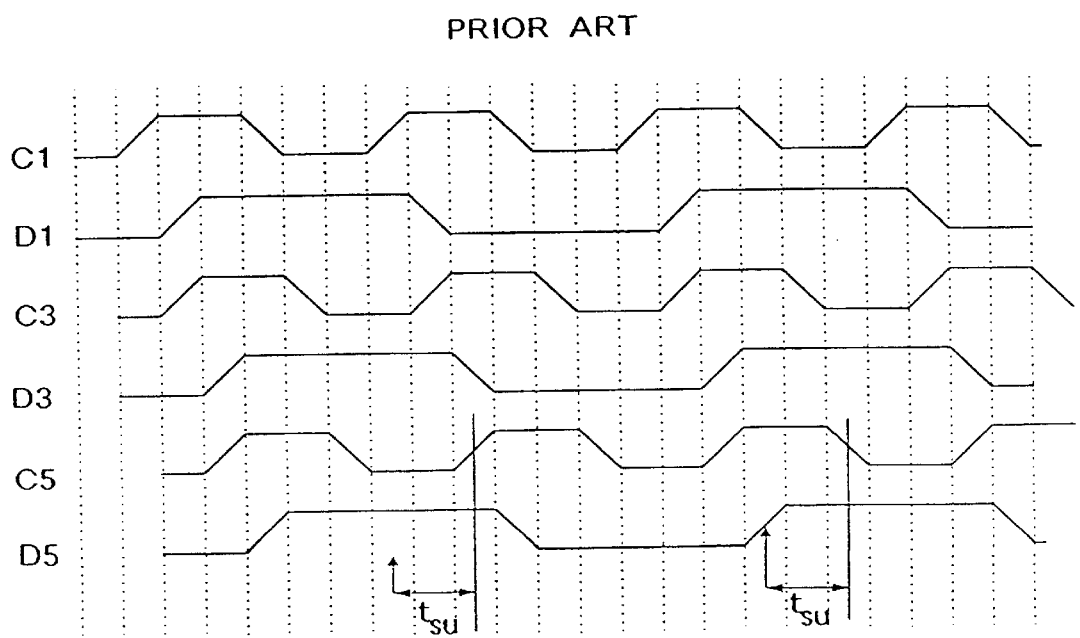
FIG. 2 shows a case of operating conditions A for circuit of FIG. 1.
Figure 3:
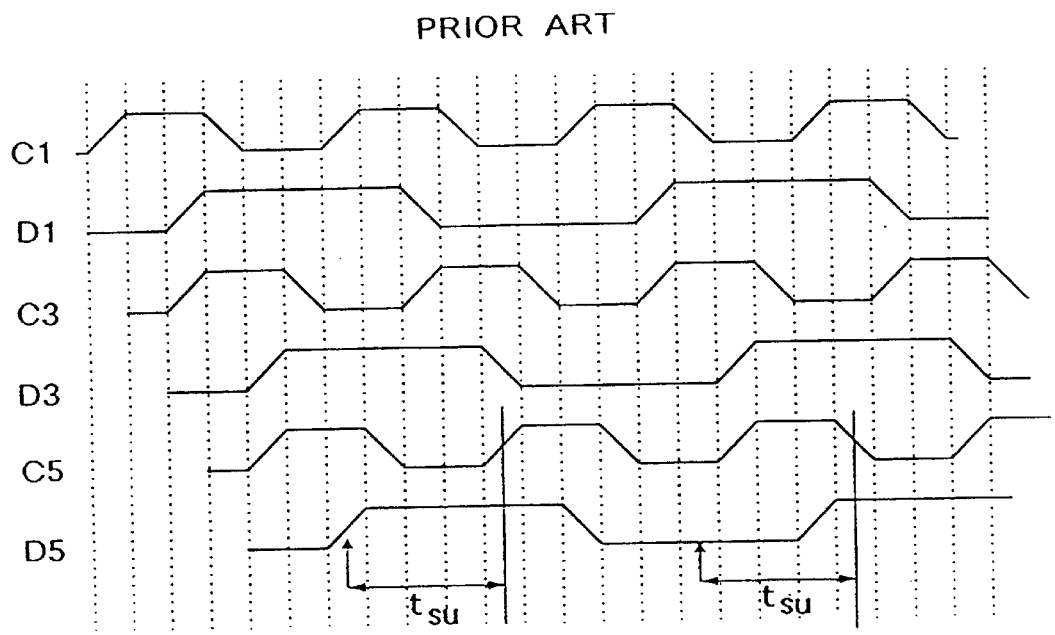
FIG. 3 shows a case of operating conditions B for circuit of FIG. 1.

The critical condition for attaining maximum data speed on the receiver side, is to ensure that data can be reliably stored in a flip-flop under a wide range of operating conditions and circuit processing parameters. This involves what is often referred to as setup time compensation. This is illustrated in FIG. 12 to be compared with the prior art of FIG. 1.

D-type flip-flops use a clock signal to store a logic level determined by the signal connected to the input D. More precisely, the level stored is the one presented on the input D during a strobe window defined by the active edge of the clock signal. The strobe window is characterized by two numbers, the setup time and the hold time, which defines the offset in time between the active clock edge and the strobe window. The setup time defines the beginning of the strobe window, the hold time defines the end of the strobe window. The data stored in the flip-flop is only impacted by the signal presented on the input D during the strobe interval.

The notions of setup and hold times are not consistently used in the industry. Often, setup and hold times are used for describing the position of the strobe window for a particular flip-flop under a particular set of operating conditions. Sometimes, however, the setup time is referred to as the maximum value, according to the previous definition, for a range of flip-flops and operating conditions, and vice versa for the hold time. Below, the notions of setup and hold times are used in accordance with the first definition.

To attain maximum data speed for the flip-flop, strobe window or the data edges should be adjusted such that changes in the data occur just outside the strobe window. This can be done with a replica circuitry in the receiving circuit. Having the same operating conditions and processing, the setup time compensation network delays will track the delays making up the setup time. If, for instance, the set-up time is approximately equal to the sum of the propagation delays in two NAND gates G1 and G2 in a NAND-gate implementation of a master-slave flip-flop as in FIG. 13a, a first order setup compensation can be built from two NAND gates equal to gates G1 and G2 which is demonstrated in FIG. 13b. In the circuitry of 14a two inverters I1 and I2 serve in a transmission gate implementation of a master-slave flip-flop, and a first order setup compensation would therefore be built from two inverters equal to those inverters I1 and I2 as indicated in FIG. 14b.

Finally in FIG. 15 is demonstrated a detailed example of a differential logic implementation of a retiming element built from integrated CMOS transistors. The operation of the circuit will be obvious to the expert and no further explanation should be necessary in this context as electrical circuitry embodying the present invention will now be obvious to the expert and such circuit diagrams are considered not necessary to be further demonstrated in detail on a component or semiconductor basis.

It will then be appreciated by those of ordinary skill in the art that the present invention can be embodied in many specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A delay matched clock and data generator having data retiming element and a clock retiming element, each retiming element having the functionality of a two-input multiplexer and being connected and operated such that a level on an output(s) is controlled from data control inputs and a timing of transitions on the output(s) is controlled from timing control inputs, the data control inputs of each retiming element corresponding to data input(s) of the two-input multiplexer, and the timing control inputs of each retiming element corresponding to select input(s) of the two-input multiplexer, wherein a clock signal(s) is connected to the timing control inputs of the retiming elements, a data signal(s) is connected to a first data control input of the data retiming element, a delayed data signal(s) is connected to a second data control input of the data retiming element, and timing control signals are connected to the data control inputs of the clock retiming element.

2. The delay matched clock and data generator of claim 1, wherein the timing control signals are configured for stopping a clock signal on the output(s) at a low level.

3. The delay matched clock and data generator of claim 1, wherein the timing control inputs signals are configured for stopping a clock signal on the output(s) at a high level.

4. The delay matched clock and data generator of claim 1, wherein the timing control inputs signals are configured for generating a delay matched inverted signal.

5. The delay matched clock and data generator of claim 2, wherein the generator is operated for clock gating.

6. The delay matched clock and data generator of claim 2, wherein the generator is operated for polarity independent clock gating.

7. The delay matched clock and data generator of claim 1, wherein only a clock signal is sent from a transmitter to a receiver domain.

8. The delay matched clock and data generator of claim 7, wherein the timing control inputs signals are configured for stopping a clock signal at a low level.

9. The delay matched clock and data generator of claim 7, wherein the timing control inputs signals are configured for stopping a clock signal at a high level.

10. The delay matched clock and data generator of claim 7, wherein the timing control inputs signals are configured for generating a delay matched inverted signal.

11. The delay matched clock and data generator of claim 8, wherein the generator is operated for clock gating.

12. The delay matched clock and data generator of claim 8, wherein the generator is operated for polarity independent clock gating.

* * * * *